US010604199B1

(12) United States Patent
Swacil et al.

(10) Patent No.: US 10,604,199 B1
(45) Date of Patent: Mar. 31, 2020

(54) SYSTEMS AND METHODS FOR REAL-TIME MONITORING OF STRUCTURAL DAMAGE TO FLEET ASSETS

(71) Applicant: HALO ASSET PROTECTION INC, Lee's Summit, MO (US)

(72) Inventors: Chris Swacil, Lee's Summit, MO (US); Nathan Pedroza, Kansas City, MO (US); Tyler Graffeo, Lee's Summit, MO (US)

(73) Assignee: HALO ASSET PROTECTION INC, Lee's Summit, MO (US)

( * ) Notice: Subject to any disclaimer, the term of this patent is extended or adjusted under 35 U.S.C. 154(b) by 0 days.

(21) Appl. No.: 16/505,075

(22) Filed: Jul. 8, 2019

Related U.S. Application Data (60) Provisional application No. 62/849,225, filed on May 17, 2019.

(51) Int. Cl.
| | | |
|---|---|---|
| *B62D 41/00* | (2006.01) | |
| *G07C 5/00* | (2006.01) | |
| *G01S 19/13* | (2010.01) | |
| *G01M 5/00* | (2006.01) | |
| *B60R 16/02* | (2006.01) | |

(52) U.S. Cl.
CPC ............ *B62D 41/00* (2013.01); *B60R 16/02* (2013.01); *G01M 5/0033* (2013.01); *G01M 5/0066* (2013.01); *G01S 19/13* (2013.01); *G07C 5/008* (2013.01)

(58) Field of Classification Search
CPC ...... B62D 41/00; B60R 16/02; G01M 5/0033; G01M 5/0066; G01S 19/13; G07C 5/008

USPC ........................................................ 701/32.2
See application file for complete search history.

(56) References Cited

U.S. PATENT DOCUMENTS

| | | | |
|---|---|---|---|
| 7,714,708 B2 | 5/2010 | Brackmann et al. | |
| 8,009,034 B2 | 8/2011 | Dobson et al. | |
| 8,322,044 B2 | 12/2012 | Gregory et al. | |
| 9,551,788 B2 | 1/2017 | Epler | |
| 2005/0231365 A1* | 10/2005 | Tester | G06K 19/07798 340/568.1 |
| 2005/0232747 A1 | 10/2005 | Brackmann et al. | |
| 2006/0164239 A1 | 7/2006 | Loda | |
| 2006/0285440 A1 | 12/2006 | Dagher et al. | |

(Continued)

FOREIGN PATENT DOCUMENTS

| | | |
|---|---|---|
| CN | 103577949 A | 2/2014 |
| CN | 109229799 A | 1/2019 |

(Continued)

*Primary Examiner* — Paula L Schneider
(74) *Attorney, Agent, or Firm* — Lathrop GPM LLP (57) ABSTRACT

A method of retrofitting a fleet asset to enable real-time damage monitoring thereof comprises securing a plurality of wires along outer surfaces of the fleet asset. The method includes configuring a control unit to: (a) continuously transmit current through each of the plurality of wires; (b) identify a damage event in response to a break in the transmitted current in any of the plurality of wires; and (c) formulate damage event data associated with the damage event in response to the identification of the damage event, the damage event data including a location of a damage. The method comprises causing the damage event data to be transmitted to a remote location.

20 Claims, 6 Drawing Sheets

(56) References Cited

U.S. PATENT DOCUMENTS

2008/0303663 A1* 12/2008 Smith .............. G08B 13/19608
340/550
2014/0246257 A1* 9/2014 Jacobsen ................ B62D 37/04
180/14.2

FOREIGN PATENT DOCUMENTS

NL          8902318 A     4/1991
WO       2010099872 A1   9/2010

* cited by examiner

SYSTEMS AND METHODS FOR REAL-TIME MONITORING OF STRUCTURAL DAMAGE TO FLEET ASSETS

CROSS-REFERENCE TO RELATED APPLICATIONS

This application claims priority to U.S. Provisional Patent Application Ser. No. 62/849,225, filed May 17, 2019, the disclosure of which is incorporated herein by reference in its entirety.

FIELD OF THE DISCLOSURE

The disclosure relates generally to systems and methods for monitoring fleet assets. More specifically, the disclosure relates to systems and methods for monitoring structural damage to fleet assets in real time.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

Systems and methods for monitoring damage to fleet assets in real-time are disclosed herein. In an embodiment, a method of retrofitting a fleet asset to enable real-time damage monitoring thereof comprises securing a ribbon wire along an outer surface of the fleet asset. The method includes providing a seismic sensor within a control unit. The method comprises configuring the control unit to: (a) continuously transmit current through the ribbon wire; (b) identify a damage event in response to: (i) a break in the transmitted current; or (ii) a seismic sensor reading above a threshold; and (c) formulate damage event data associated with the damage event in response to the identification of the damage event. The damage event data includes a time of the damage event. The method includes causing the damage event data to be transmitted to a remote location.

In another embodiment, a method of retrofitting a fleet asset to enable real-time damage monitoring thereof comprises securing a plurality of wires along outer surfaces of the fleet asset. The method includes configuring a control unit to: (a) continuously transmit current through each of the plurality of wires; (b) identify a damage event in response to a break in the transmitted current in any of the plurality of wires; and (c) formulate damage event data associated with the damage event in response to the identification of the damage event. The damage event data includes a location of a damage. The method comprises causing the damage event data to be transmitted to a remote location.

In yet another embodiment, a method of retrofitting a fleet asset to enable real-time damage monitoring thereof comprises securing a wire along an outer surface of the fleet asset. The method includes configuring a control unit to: (a) continuously transmit current through the wire; (b) identify a damage event in response to a break in the transmitted current; and (c) formulate damage event data associated with the damage event in response to the identification of the damage event. The method comprises causing the damage event data to be transmitted to a remote location.

BRIEF DESCRIPTION OF THE DRAWINGS

Illustrative embodiments of the present disclosure are described in detail below with reference to the attached figures.

DETAILED DESCRIPTION

The disclosure relates to a system configured to detect (e.g., in real-time) and/or monitor structural damage to fleet assets, and to methods of using this system. The phrase "fleet assets", as used herein, refers to trailers (e.g., semi-trailers, rental-trailers, etc.), containers, cargo carrying vehicles (e.g., trucks, semis, etc.), and other such receptacles for carrying cargo. The system may be usable to detect an occurrence of a damage event, a location associated with the damage event (e.g., a location of the damage on the fleet asset, a geographical location of the fleet asset at the time the damage occurred, etc.), a time of or associated with the damage event, and/or any other data relating to the damage event (e.g., environmental information). In an embodiment, the system may have at least one sensor in communication with a remote device, such as a satellite, a computing device, a data server, et cetera. The system may be usable to assign financial liability to the party responsible for the damage to the fleet asset.

The prior art is focused on protection of the cargo being carried by a fleet asset. The prior art is unconcerned, however, with the fleet asset itself. Fleet assets may get damaged during operation. This is a billion-dollar problem that is currently unaddressed.

Fleet assets may be particularly prone to sustaining structural damage when they are being loaded and/or unloaded via a crane. The artisan understands that fleet assets, and particularly fleet assets (e.g., containers and trailers) configured to be loaded and unloaded via cranes or other such heavy machinery, may have one or more lift points. A lift point may be a portion of the fleet asset specifically configured to be used for the lifting of the fleet asset (e.g., for loading the fleet asset on a ship, for unloading the fleet asset off a train, et cetera). The lift points may be reinforced so as to allow for the fleet asset to be lifted thereby without damage to the fleet asset.

The lift points on one fleet asset and another fleet asset may not correspond to each other. For example, one fleet asset may have lift points at or by the edges, and another fleet asset may have lift points that are spaced away from the edges. A crane operator may set up the crane such that the lifting portion thereof engages the one or more lift points of one fleet asset, and then load or unload that fleet asset as required. The crane operator may then load or unload another fleet asset using the same crane lifting portion setting, as changing of the crane lifting portion setting to align with each fleet asset's lift points may be time consuming and adversely affect the crane operator's efficiency. Put simply, the crane operator may be more concerned with the completion of the loading or unloading job at hand as compared to the well-being and integrity of the fleet asset. The crane operator may therefore lift the fleet asset using a fleet asset portion other than the designated lift point, and in so doing, damage the fleet asset.

The inventors have found that fleet assets may also get damaged routinely when they are being transported from one dock to another. Specifically, a yard hostler truck with hydraulics may be used to carry the fleet asset from one dock to another. Where the fleet asset is not properly configured on the yard hostler truck, it may fall off the yard hostler truck onto the ground (e.g., from a height of two feet). The resulting impact may cause the fleet asset much damage. Of course, a fleet asset may also get damaged for other reasons, e.g., where an object on the road or elsewhere strikes the fleet asset during transport, in case of an accident or otherwise because of the negligence of the fleet asset operator, et cetera.

A commercial fleet's insurer may require that damage to a fleet asset be reported to the insurer within a narrow time window, and the insurer may refuse to entertain the claim for damage if the damage to the fleet asset is not reported within this narrow window (e.g., within a week of the damage). As such, if the damage is not determined and reported to the insurer swiftly, the fleet owner (or another, e.g., a fleet manager) may be forced to pay for the potentially costly repairs out of pocket. Further, considering fleet assets may be handled by numerous parties any given week, where the fleet owner does not discover the damage at the time of occurrence, it may be difficult to identify the culpable party because any one of numerous parties that operated the fleet asset relatively recently may be responsible for the damage. The fleet owner (or another non-responsible party, e.g., the entity operating the asset at the time of damage discovery) may therefore be left to foot the repair bill, which may significantly impact profitability. Such may, of course, be undesirable. Embodiments of the present disclosure may address this problem, and others, at least in part.

Figure 1:
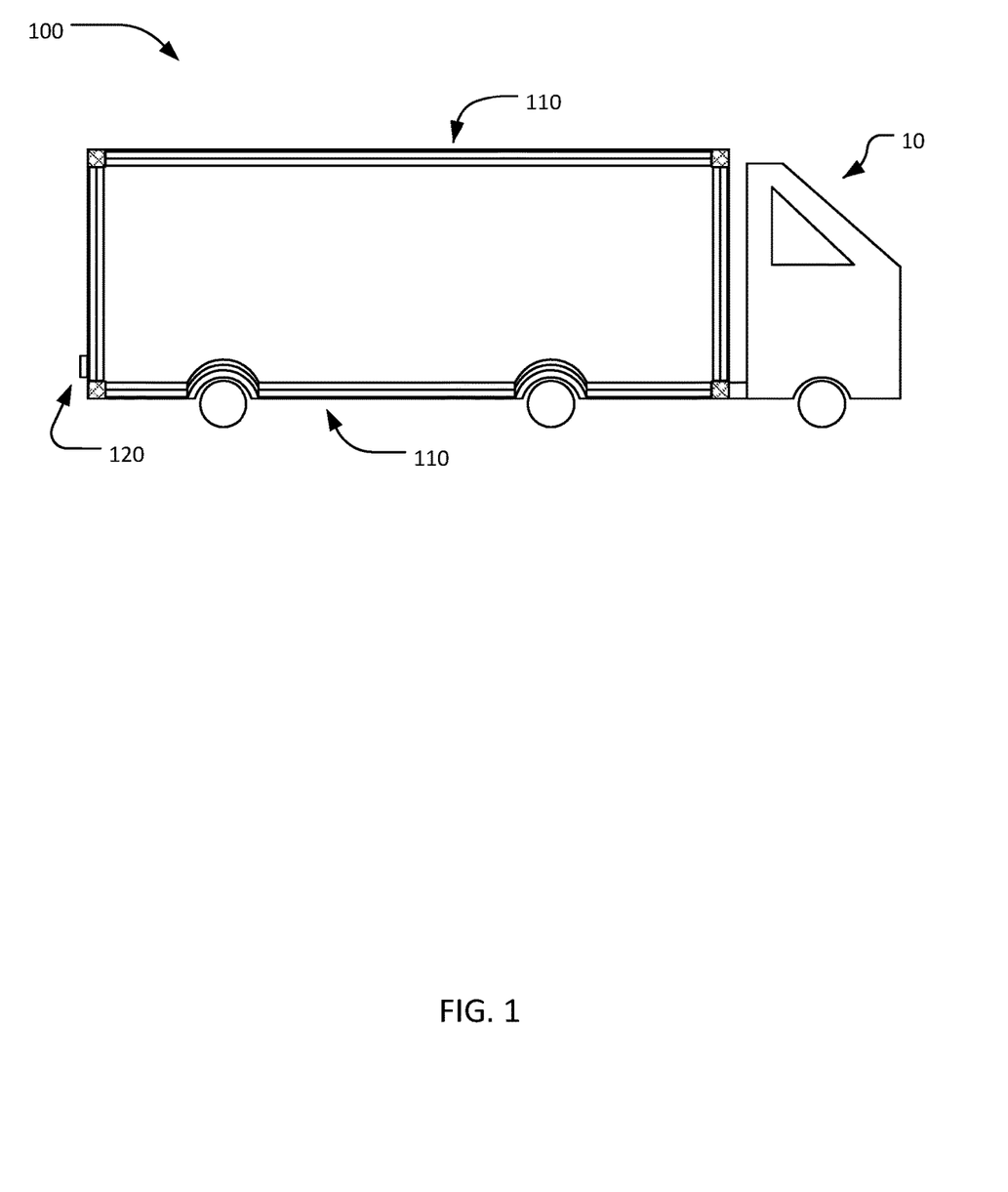
FIG. 1 is a side view of a damage detection system, according to an embodiment of the present disclosure.

Turning now to FIG. 1, an embodiment 100 of the damage detection system may have one or more sensing portions 110 and a control unit 120 communicatively coupled thereto. In some embodiments, the damage detection system 100 may make use of a computing system 130 (see FIG. 4). The damage detection system 100 may be integrated with an existing fleet asset. For example, the fleet asset may be a conventional container 10 retrofitted with the damage detection system 100 to monitor damage to the container 10 in real-time. It is to be understood that the container 10 is used herein as an exemplary fleet asset, and that the damage detection system 100 may likewise be usable to monitor damage to other fleet assets. Furthermore, in some embodiments, the damage detection system 100 may be configured to monitor damage to an object other than a fleet asset, such as a non-commercial vehicle, an aircraft, a roadway, et cetera. One important benefit afforded by the system 100 may be that the system 100 may be usable to monitor, in real-time, the damage to existing fleet assets inexpensively and comprehensively. That is, the system 100 does not require specialty fleet assets built with integrated sensors or costly materials, for example, but instead, is usable to monitor damage to the many millions of conventional fleet assets already in existence.

Figure 2A:
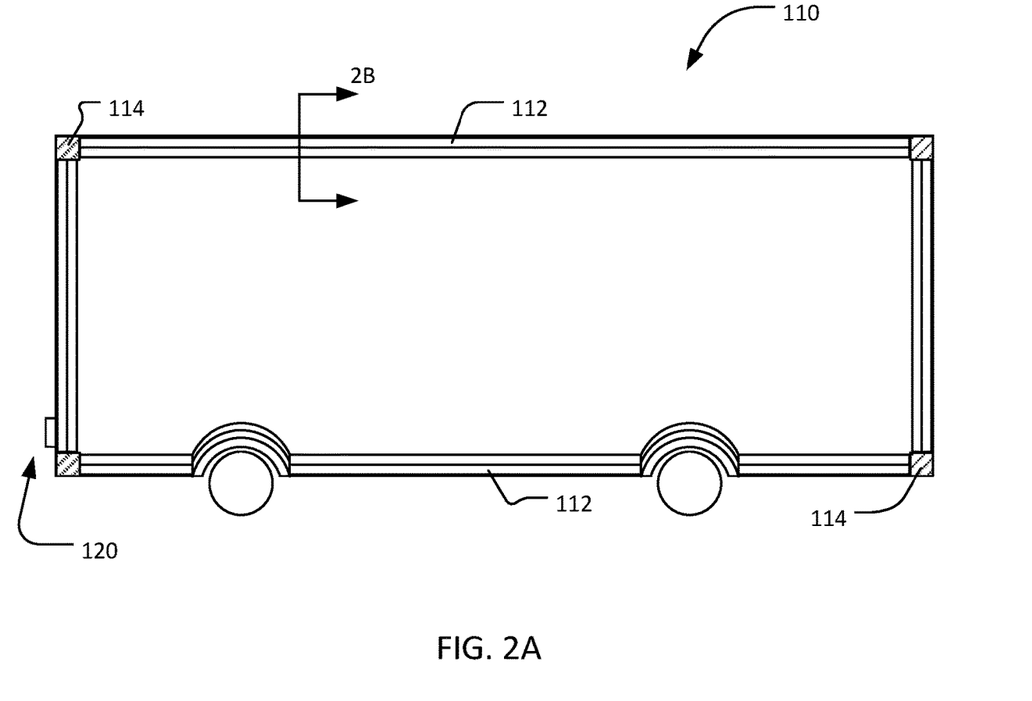
FIG. 2A is a side view of an arrangement of a sensing portion of the damage detection system of FIG. 1.
Figure 2B:
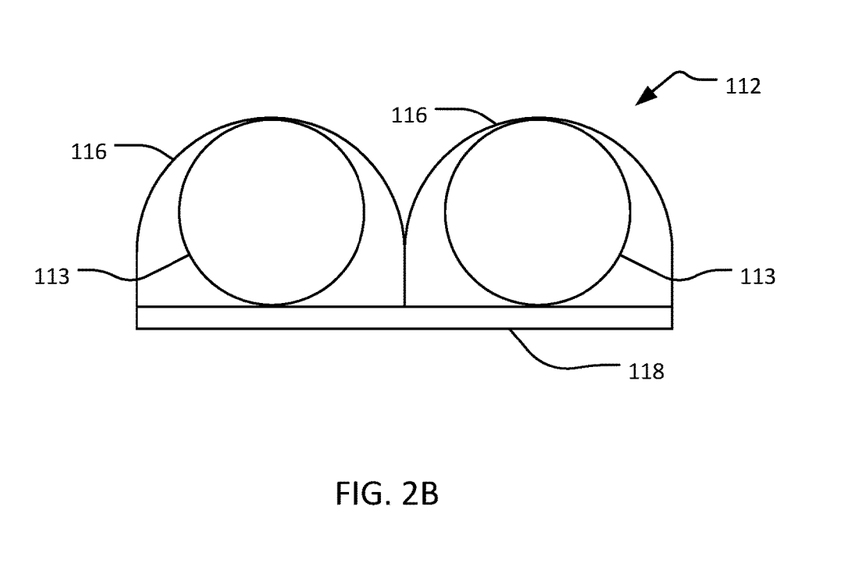
FIG. 2B is a section view of the sensing portion of the damage detection system of FIG. 1.

The sensing portions 110 may include a sensing node 112, a communication node 114, and in embodiments, a housing 116, as seen in FIGS. 2A-2B. The sensing portions 110 may be removably or permanently adhered to the fleet asset (e.g., the container 10) to detect damage thereto. The sensing nodes 112 may be communicatively linked with the communication node 114 for the exchange of information, data, and/or commands therebetween.

The control unit 120 may determine that a damage event has occurred based on information the control unit 120 receives from the sensing portions 110. The control unit 120 may then formulate damage event data for transmission to a remote location, as discussed herein. The damage event data may include, for example, information about the detection of an impact or other damage event, the magnitude of the damage event, the extent of the damage, the time of the event, the part of the fleet asset that sustained the damage, the geolocation of the fleet asset when the event occurred, and/or any other damage event data.

In more detail, the sensing node 112 may have one or more sensors 113 for registering damage, a force, and/or an impact. The sensors 113 may comprise a wire (or other charge carrying cable), a strain gauge, an accelerometer, a detecting ribbon cable, a seismic sensor, and/or any other suitable sensor. The sensors 113 may be configured to detect impacts and/or forces exerted directly upon the sensing node 112 and/or in proximity thereto. In embodiments, the sensors 113 of the sensing nodes 112 may be strategically located at areas of the fleet asset most likely to sustain damage. In an embodiment, the sensors 113 may be configured on portions of the front and back sides, the side rails, doors, and/or the radius corners of the fleet asset. In another embodiment, the fleet asset may have a sensor 113 located at and/or around the under carriage, the running gear, underneath and/or above the lift point, one or more cross members, one or more external surfaces, and/or one or more edges, to monitor structural damage thereto. Care may be taken to ensure that the sensors 113 are not disposed on areas of the fleet asset specifically designed to withstand significant force (e.g., the lift points), as doing so may lead to false alarms. In embodiments, the sensing node 112 may use one or more non-contact sensors 113 to detect impacts and/or forces in proximity of the sensors 113. In embodiments, two or more types of sensors may serve as the damage detecting sensors 113.

To illustrate, consider the embodiment where the sensing node 112 includes electronic ribbon cables as the sensors 113. Ribbon cables may, in embodiments, be preferable to other cables (e.g., shielded coaxial cables) because of the ability of the ribbon cables to repeatedly flex without sustaining any damage. The sensors 113 may be strategically arranged on the container 10. The control unit 120 may cause a signal (e.g., a low amperage current) to be continuously passed therethrough. Where there are multiple sensing nodes 112, the control unit 120 may cause the continuous current to be passed through each of the sensing nodes 112 independently. When current flow within any one of the wires is interrupted or otherwise altered, e.g., in response to impact from a crane's lifting portion or another object, the control unit 120 may determine that a damage event has occurred and formulate damage event data. The current may be altered when, for instance, an object contacts or otherwise exerts a force on the wires and modifies the wires effective impedance, breaks the wires to open the circuit, et cetera. The control unit 120 may then cause the damage event data to be transmitted to a remote location. For example, the damage event data may be transmitted to a third party, as discussed herein.

In an embodiment, the sensing nodes 112 may include a multi-point connective strip attached to an exterior of the fleet asset, which may link the sensors 113 to the communication node(s) 114. The multi point connective strips may enable the user to selectively configure a horizontal, vertical, or angled sensing node 112 arrangement throughout some or all of the exterior surface of the fleet asset.

In another embodiment, the sensor 113 may be a digital strain gauge (e.g., a resistive foil gauge) placed on the container 10. When a force is exerted upon the digital strain gauge, the digital strain gauge may deform. When deformed, the effective resistance through the digital strain gauge may change and the gauge may respond by changing the voltage outputted by the strain gauge. The changed output voltage may then be digitally converted to determine the magnitude of the force exerted on the strain gauge. The magnitude of the force detected by the strain gauge may then be routed (e.g., via the communication node 114) to the control unit 120.

In some embodiments, the magnitude of the force exerted upon the sensors 113 must reach a threshold value before the control unit 120 considers the event to be a damage event. Tests may be completed to determine the force threshold value for a particular fleet asset or a portion thereof (e.g., the threshold may be higher for a fleet asset with enhanced structural integrity, as more force may be needed to cause damage to such a fleet asset). In these embodiments, the control unit 120 may only formulate damage event data for transmission in cases where the force threshold value has been met, and otherwise, disregard the event. In operation, establishing a force threshold value may facilitate the detection of forces that may cause structural damage to a fleet asset, as opposed to those forces that may cause only cosmetic damage. For example, the force threshold value may, in an embodiment, be met by the force from a collision between the fleet asset and another vehicle, but may not be met by the impact of typical small debris encountered when transporting the fleet asset. In embodiments, a threshold may be associated with each of multiple conditions (e.g., a low threshold for minor impact, a high threshold for severe impact, et cetera). A plurality of force threshold values may facilitate an assessment of the severity of a force on the fleet asset. In embodiments, a danger level (e.g., minor, mild, severe, etc.) may be assigned to the force detected based on the threshold met. In the same vein, where the sensor 113 is a current carrying ribbon cable, severity of the force may be differentiated depending on whether the circuit is temporarily interrupted or broken (e.g., due to breakage of the cable).

The threshold value of the sensing nodes 112 may, in embodiments, be adjustable (e.g., dynamically adjustable, manually or automatically adjustable, et cetera). For instance, the force threshold value of the sensing nodes 112 may be adjusted to suit current operating conditions of the fleet asset. In embodiments, different threshold values may be chosen for different portions of the same fleet asset. For instance, the container 10 may have a force threshold value for a top rail that is different from a force threshold value for a side edge. Further, the plurality of force threshold values may be used to monitor various points of the fleet asset. For instance, various portions of the fleet asset may be more or less susceptible to damage relative to other portions of the fleet asset, and the use of different thresholds may allow for each of the various portions to be appropriately monitored.

Figure 2C:
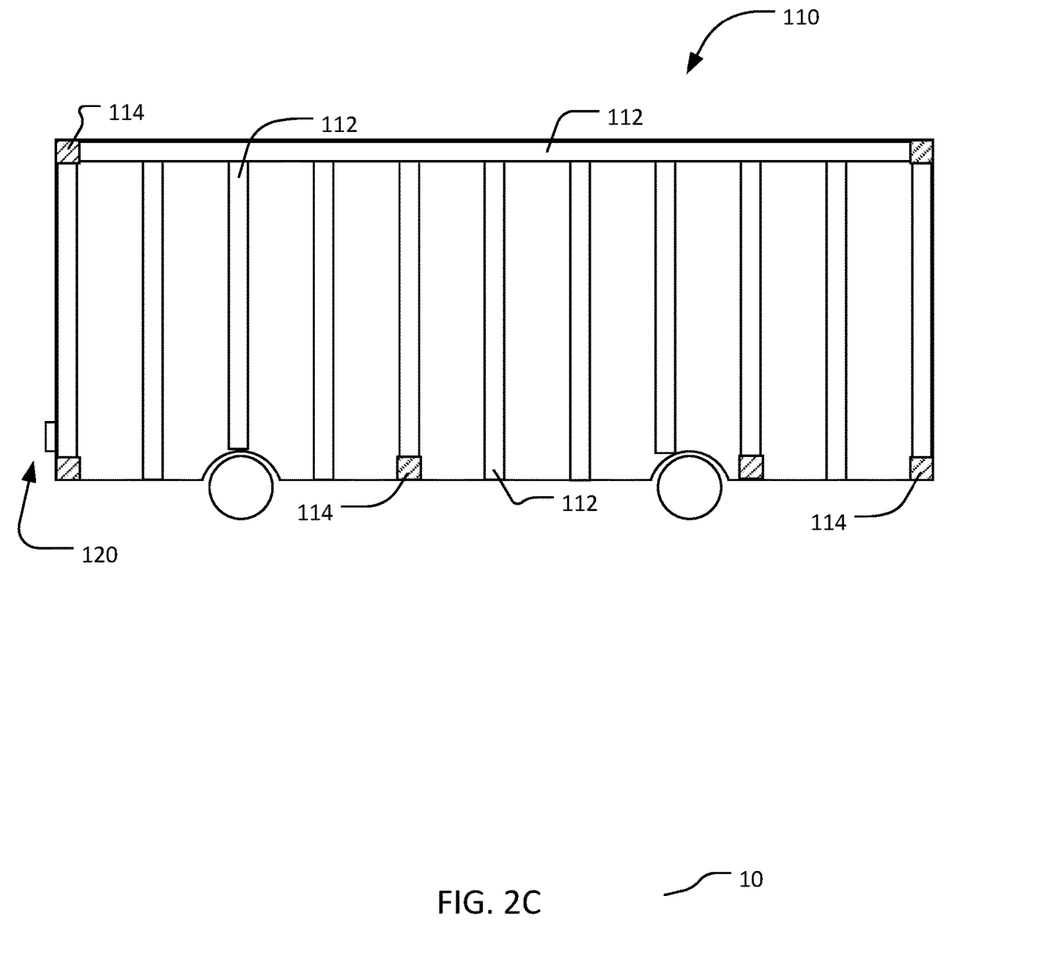
FIG. 2C is a side view of another arrangement of the sensing portion of the damage detection system of FIG. 1.

The sensors 113 of the sensing nodes 112 may be arranged in distinct groups to facilitate the identification of a damaged area, as seen in FIG. 2C. For example, a plurality of sensing nodes 112 may be arranged on an exterior of the container 10 in a number of groups containing at least one sensing node 112 each. Each of the sensing node 112 groups may be associated with an area of the container 10, and the damage detection system 100 may be configured to identify the location of the sustained damage based on the location of the impacted sensing node 112.

The sensing nodes 112 may alternately or additionally include sensors 113 configured to detect parameters other than impacts or forces, such as environmental conditions. For example, in an embodiment, one or more sensing nodes 112 may include a temperature sensor, a humidity sensor, a light sensor, a speed sensor (e.g., a tachometer), a global positioning sensor, and/or any other suitable sensor now known or subsequently developed for gathering information regarding the environmental conditions of the fleet asset. In some embodiments, the control unit 120 may be communicatively linked to existing fleet asset systems, such as the GPS and/or the telematics system thereof, et cetera. The link may be wired and/or wireless.

The communication node 114 may be any suitable communications device for receiving, sending, and/or routing signals, such as sensor 113 data. The communication node 114 may include one or more transceiver modules configured for transmitting and receiving data, and using, for example, one or more protocols and/or technologies, such as wires, Bluetooth, GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. In operation, the communication node 114 may relay (e.g., wired/wirelessly), among other things, sensing data received from the sensors 113 to one or more other devices, such as the control unit 120 and/or user computing devices (e.g., a phone, desktop computer, laptop computer, et cetera). It is to be understood that the communication node 114 may be configured to relay other signals, such as commands for the sensing nodes 112.

The communication node 114 may receive sensing data from a plurality of sensors 113 (e.g., via a wired and/or wireless network). In other words, a communication node 114 may be communicatively linked to a plurality of sensors 113. In an embodiment, the sensing portion 110 may include a plurality of communication nodes 114 for communicating with one or more devices. The communication node(s) 114 may be arranged on the fleet asset (e.g., on an exterior surface thereof, within an interior of the fleet asset, et cetera). In some embodiments, a separate communication node 114 may be omitted and/or the functionality thereof may be provided within the control unit 120.

In embodiments, the control unit 120 may be communicatively linked with one or more control units 120 of other damage detection systems 100. For instance, the control unit 120 may be in data communications with another damage detection system 100 that, for example, has been arranged on another fleet asset. Such communicative coupling between systems 100 may, in embodiments, enhance the capabilities of the systems. For example, in an embodiment, a damage detection system 100 may be provided on each of a multitude of fleet assets traveling as a group. In this example, the data communicated between the damage detection systems 100 may be used to modify operation of another damage detection systems 100 within the group. For example, the shared data may be used to manually or automatically adjust the force threshold value of sensors 113 of all systems 100 in the group (e.g., the force threshold may be increased for all systems 100 in the group where data from the leading fleet asset indicates excessive debris).

It may be advantageous, in some embodiments, for the sensing nodes 112 and/or the communication nodes 114 to be housed (e.g., partially or wholly) within the housing 116. The housing 116 may be a protective casing and/or coating configured to mitigate some or all of the wear or damage inflicted upon the sensing nodes 112 or communication nodes 114. Alternately or additionally, the housing 116 may assist in protecting the sensing nodes 112 and/or communication nodes 114 from environmental conditions, such as moisture, heat, dust, et cetera. The housing 116 may be a plastic tubing, a plastic casing, a metal casing, and/or any other suitable protective housing now known or subsequently developed. While the sensing portion 110 may receive power from the control unit 120 and/or the fleet asset, it may be advantageous to include, in embodiments, a backup power source (e.g., a battery, a solar panel, etc.) in, on, and/or within the housing 116.

In some embodiments, the housing 116 may be configured to be destroyed upon receiving a sufficiently forceful impact or other damage causing event. For example, the housing 116 may be an ablative coating that covers wires acting as sensors 113. In operation, the ablative housing 116 may protect the wires from certain environmental conditions (e.g., moisture, dust, etc.), while also allowing the wires to perform their function as sensors 113. In other words, the current running through the wires may be interrupted by the occurrence of a damage event, but the housing 116 may preclude debris or other such minimal impacts from being registered as damage events.

In some embodiments, the housing 116 may be configured to visually indicate a damage event, including the location of damage on the fleet asset. For example, the housing 116 may have a coating that changes colors after experiencing a damage causing event, such as by turning a different color at the location of the damage causing event, releasing a paint, pigment, and/or ink upon impact, et cetera. Alternately or additionally, at least a part of the interior of the housing 116 may have a different color than the exterior of the housing 116, which may be visually exposed to a user after experiencing a damage event.

The housing 116 may be arranged upon an exterior of the fleet asset. There may be a plurality of housings 116, such as one for each of the sensing nodes 112 and/or communication nodes 114. However, it is to be understood that each of the housings 116 may have any number and combination of sensing nodes 112 and/or communication nodes 114. To illustrate, a container 10 may have, for example, both a housing 116 containing a sensing node 112 and a communication node 114 and another housing 116 containing a plurality of sensing nodes 112 and communication nodes 114.

Returning now to FIG. 2B, it shall be understood that the sensing portion 110 (e.g., the sensing nodes 112, communication nodes 114, and/or the housing 116) may be secured to the fleet asset (e.g., an exterior surface thereof) via any suitable fastener 118 or combination of fasteners now known or subsequently developed. For instance, the sensing portion 110 may be secured to the fleet asset using nails, screws, adhesives, glues, tapes, epoxies, magnets, et cetera. Various portions of the system 100 may be configured to be removably or permanently secured to the fleet asset via the fastener 118. For example, where the sensor 113 is a current carrying cable and the fastener 118 is a nail, the wire may include equidistant or other loops through which the nails may be passed to secure the sensor 113 to the fleet asset. In one embodiment, the selected fastener 118 may be one that does not cause any damage or any appreciable damage to the fleet asset (e.g., the fastener 118 may be tape) as the sensor 113 is secured to an outer surface of the fleet asset.

It is to be understood that the sensing portion 110 (i.e., the sensing nodes 112, the communication nodes 114, etc.) and the control unit 120 may be arranged on a conventional or preexisting fleet asset (i.e., the fleet asset may be retrofit with sensing portion 110 and the control unit 120). The sensing portion 110 may include on or more sensing nodes 112 that may, in embodiments, be disparate from each other. The sensing nodes 112 may be arranged as desired by a user, such as in a pattern, randomly, at a location where the specific type of sensor(s) 113 included in the sensing node 112 may operate effectively, or at locations where the fleet asset may typically receive damage or impacts. For example, a current carrying cable may be provided on the fleet asset's exterior surface to detect a damage event resulting from an object (e.g., a crane, another fleet asset, et cetera) impacting the exterior surface and a seismic sensor may be provided within the control unit 120 or elsewhere to detect a damage event resulting from the fleet asset being dropped by a yard hostler truck (e.g., a damage event may be identified when the seismic sensor reading exceeds a threshold). Or, for instance, a sensing node 112 containing a strain gauge may be placed along an edge of the container 10 and a sensing node 112 with an accelerometer may be arranged at a center portion of a side wall of the container 10. Such flexibility may allow for use of sensing nodes 112 best suited for the area of the fleet asset being monitored and the application for which the fleet asset is being employed. In some embodiments, the damage detection system 100 (e.g., the sensing portion 110) may be arranged on an exterior surface of the fleet asset, and underneath a decal layer thereof. For example, a truck trailer may have a decal (e.g., a brand name or advertising decal) covering a portion of the exterior trailer wall, and at least some of the damage detection system 100 may be arranged between the trailer wall and the decal.

Figure 3:
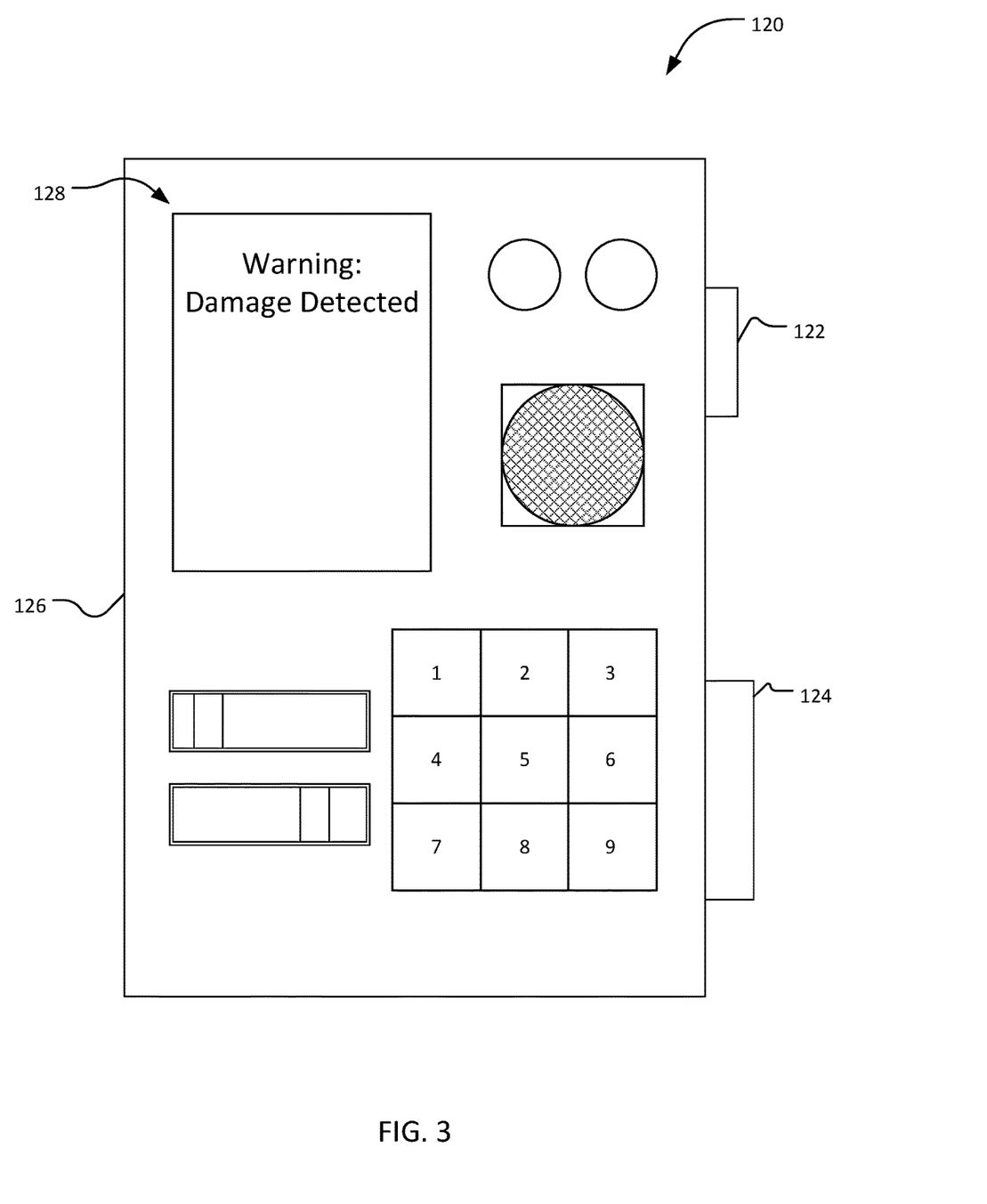
FIG. 3 is a detailed view of a user interface of a control unit of the damage detection system of FIG. 1.

Turning now to FIG. 3, the control unit 120 may have a communication device 122 and, in embodiments, an alert generating device 124, which may both be housed within a control unit housing 126. Alternately or additionally, the control unit 120 may incorporate a computing system 130 (see FIG. 4) to execute one or more of the control unit 120 functions described herein. The control unit 120 may be arranged in, on, and/or within the fleet asset to be monitored, such as be secured with a fastener to an external surface of the fleet asset. In embodiments, the control unit 120 may be placed elsewhere. In operation, the control unit 120 may receive information (e.g., damaging event detections, environmental condition information, etc.) generated by or otherwise associated with the sensing portion 110. The control unit 120 may then, in embodiments, add additional information to the received data, such as time information, damage location information, global positioning information, environmental information received from sensors included in the control unit 120, and/or other suitable information, to compose damage event data D. The control unit 120 may route the damage event data D to an external device and/or storage system 30. In embodiments, the control unit 120 may route the data D to a third party 30T (see FIG. 4). The third party 30T may, e.g., apprise the fleet asset owner or operator of the damage. In embodiments, the third party 30T may cause the fleet asset in question to be visually inspected to verify the damage and the extent thereof.

The communication device 122 may be configured to handle communication links between the control unit 120 and other external devices (e.g., the sensing portion 110) or receivers, and to route incoming/outgoing data appropriately. For example, inbound data from the communication nodes 114 and/or the sensing nodes 112 may be routed through the communication device 122, and outbound data from the control unit 120 may be routed through the communication device 122 before being directed to a third party and/or remote storage 30 (e.g., via a network 20). The communication device 122 may include one or more transceiver modules configured for transmitting and receiving data, and using, for example, one or more protocols and/or technologies, such as wires, Bluetooth, GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. In embodiments, the communication device 122 may be communicatively linked to a telematics system (e.g., a satellite telematics system) for the routing of damage event data D to the third party 30T and/or the remote storage 30. The communication device 122 may, in embodiments, formulate and communicate damage event data D real time (i.e., when the damage occurs), subsequently (e.g., at a fixed or predetermined time each day), or both. In operation, the communicated information may facilitate identification of the party responsible for damage that occurred to the fleet asset.

The alert generating device 124 may be in communication with the sensing nodes 112 (e.g., via the communication device 122), and may use data therefrom to generate an alert. An alert may be generated based upon a determination by the control unit 120 that a damage event has occurred. For example, the alert may be generated in response to a determination that the current passing through one or more wires has been interrupted, in response to a determination that a seismic sensor has sensed significant impact, et cetera. The alert may be any suitable combination of messages, information, data, texts, calls, warnings, audible tones, and so on. The alert may be also sent (e.g., via the communication device 122) to a third party and/or device, such as a remote storage (e.g., remote storage 30), a satellite of a telematics system, a computing device, a phone of a user (e.g., a phone of an operator of the fleet asset), et cetera. The artisan will understand the control unit 120 may send the alert to a third party indirectly (e.g., via the telematics system). In some embodiments, the alert generating device 124 may actuate an external alert device remote from the asset being monitored (e.g., in a warehouse office or elsewhere). In some embodiments, the alert generating device 124 may generate a locally visual and/or audible alert. For example, the alert generating device 124 may audibly and/or visually produce an alert via a user interface 128 of the control unit 120. The user interface 128 may include any suitable lights, displays, and/or speakers now known or subsequently developed to indicate to the user the detection of the damage causing event.

The user interface 128 may alternately or additionally include one or more devices for the manipulation of the damage detection system 100. For example, the user interface 128 may include a display (e.g., a touchscreen display), buttons, switches, et cetera. In operation, the user interface 128 may allow the user to interact with the damage detection system 100, such as by changing one or more settings, powering the system 100, adjusting a force threshold force value of a sensing node 112, accessing a record of a detected damage causing event, et cetera.

In some embodiments, the user may register and/or authenticate themselves via the user interface 128, such as by using a biosensor, a numeric keypad, a keyboard, et cetera. Alternately or additionally, the user may register and/or authenticate themselves by using an external phone (e.g., smart phone), computing system, et cetera. In such embodiments, the communication device 122 may include user authentication or registration information when routing damage event information. The control unit 120 may be communicatively linked to a control device of the fleet asset, and may prevent a user from operating the fleet asset until the user has authenticated or registered themselves with the control unit 120. In operation, registering or authenticating a user may help facilitate the identification of a responsible party when damage occurs to the fleet asset.

In embodiments where wires are used in one or more sensing nodes 112, the control unit 120 may cause current to be passed through the wires coupled to the fleet asset, or otherwise facilitate the passage of current through these wires. The control unit 120 may detect the interruption of current passing through these wires and record a damage event occurrence based on the location of the interrupted wire on the asset. To illustrate an example, the control unit 120 may record that the lower left rail of the container 10 is potentially damaged when current flowing through the sensing node 112 (e.g., through the wire thereof) coupled to the lower left rail is interrupted.

The control unit 120 may include a power source, such as a battery, a solar panel, reefer unit, telematics power source, a connection to the fleet asset's power, and/or any other suitable power source now know or subsequently developed. In embodiments, the power sources of two components of the damage detection system 100 may be disparate. For example, there may be separate power sources for the sensing portion 110 and the control unit 120.

Figure 4:
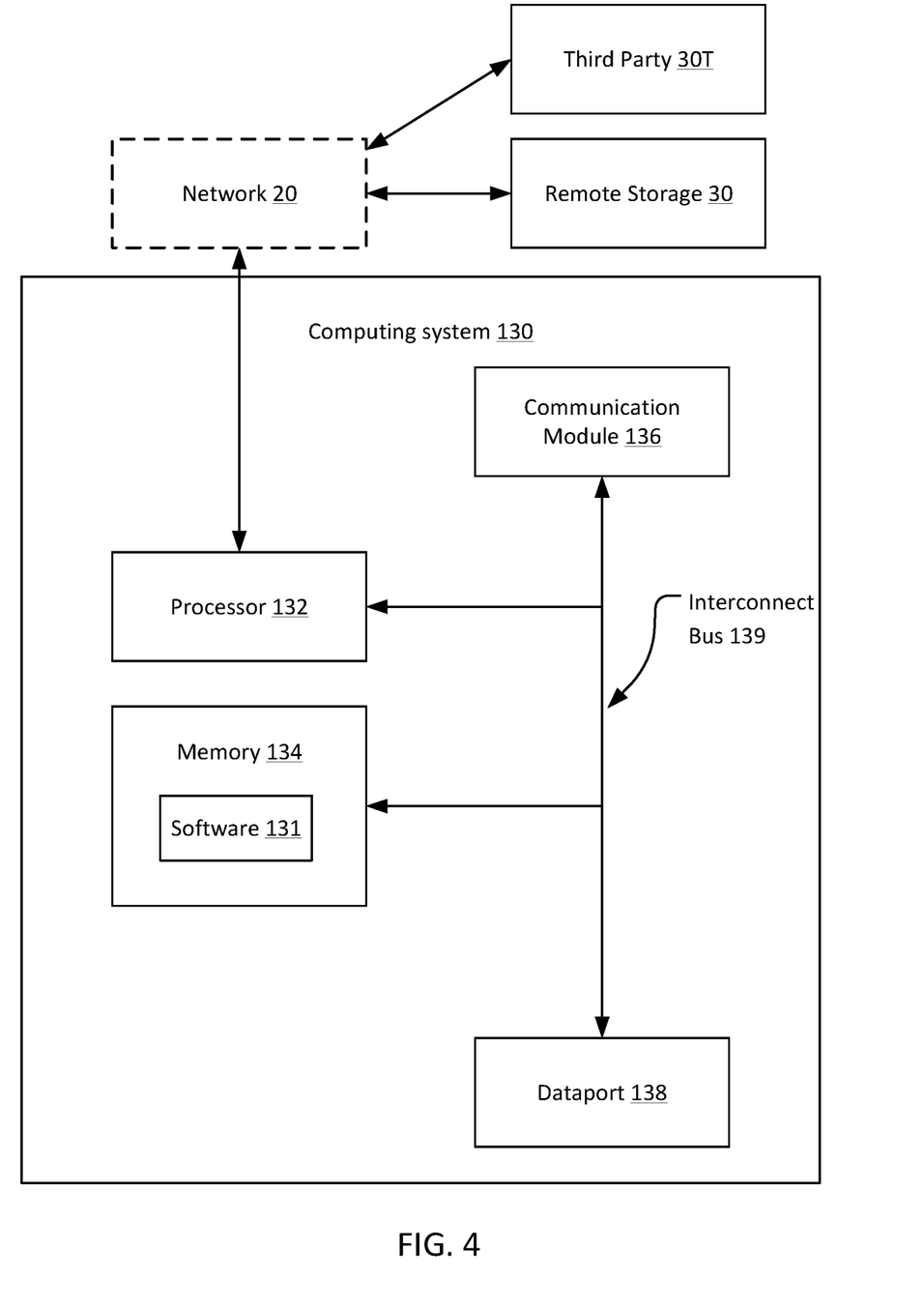
FIG. 4 is a block diagram depicting a computing system of the damage detection system of FIG. 1.

FIG. 4 is a functional block diagram of the computing system 130 which may be used to facilitate (e.g., by being incorporated with the control unit 120) the various damage detection system embodiments according to the different aspects of the present disclosure. The computing system 130 may be, for example, a smartphone, a laptop computer, a desktop computer, a flexible circuit board, or other computing device whether now known or subsequently developed. The computing system 130 may include a processor 132, a memory 134, a communication module 136, and a dataport 138. These components may be communicatively coupled together by an interconnect bus 139. The processor 132 may include any processor used in smartphones and/or other computing devices, including an analog processor (e.g., a Nano carbon-based processor). In certain embodiments, the processor 132 may include one or more other processors, such as one or more microprocessors, and/or one or more supplementary co-processors, such as math co-processors.

The memory 134 may include both operating memory, such as random access memory (RAM), as well as data storage, such as read-only memory (ROM), hard drives, optical, flash memory, or any other suitable memory/storage element. The memory 134 may include removable memory elements, such as a CompactFlash card, a MultiMediaCard (MMC), and/or a Secure Digital (SD) card. In certain embodiments, the memory 134 includes a combination of magnetic, optical, and/or semiconductor memory, and may include, for example, RAM, ROM, flash drive, and/or a hard disk or drive. The processor 132 and the memory 134 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 132 may be connected to the memory 134 via the dataport 138.

The communication module 136 may be configured to handle communication links between the computing system 130 and other external devices or receivers and to route incoming/outgoing data appropriately. For example, inbound data from the dataport 138 may be routed through the communication module 136 before being directed to the processor 132, and outbound data from the processor 132 may be routed through the communication module 136 before being directed to the dataport 138. As another example, the communication module 136 may route information to and from the sensing nodes 112, the communication node 114, and/or the network 20. The communication module 136 may include one or more transceiver modules configured for transmitting and receiving data, and using, for example, one or more protocols and/or technologies, such as wires, Bluetooth, GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 138 may be any type of connector used for physically interfacing with wires, a smartphone, a computer, and/or other devices, such as a mini-USB/USB port, an IPHONE®/IPOD® 30-pin connector, and/or a LIGHTNING® connector. In other embodiments, the dataport 138 may include multiple communication channels for simultaneous communication with, for example, other processors, servers, and/or client terminals.

The memory 134 may store instructions for communicating with other systems, such as a computer. The memory 134 may store, for example, a program (e.g., computer program code) adapted to direct the processor 132 in accordance with the embodiments described herein. The instructions also may include program elements, such as an operating system. While execution of sequences of instructions in the program causes the processor 132 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 134 includes software 131. The software 131 may contain machine-readable instructions (e.g., a software application) configured to be executed by the processor 132. The software 131 may, for example, process data inputs to the computing system 130 (e.g., sensing node 112 information, user manipulations inputted via the user interface 128, et cetera). The software 131 may cause the computing system 130 to dynamically respond to a signal from the sensing node 112, such as by generating an alert in response to a damaging event detection. In embodiments, a computing device (e.g., a user computing device, a user smart phone, etc.) may implement (e.g., download, install, execute, etc.) the software 131, and in this manner, be configured to enact some or all of the functions of the damage detection system 100 disclosed herein. In other words, the computing device may be configured, retrofitted, and/or reconfigured with the software 131, for use with the damage detection system 100.

The computing system 130 may be in data communication with a remote storage 30 over a network 20. The network 20 may be a wired network, a wireless network, or comprise elements of both. The remote storage 30 may be, for example, the "cloud", a remote database, a telematic satellite, and/or any other suitable remote storage, such as those in communication with other computing systems. In embodiments, data (e.g., damage event data) may be stored in the remote storage 30 for use thereof. For instance, fleet asset damage event data routed to the remote storage 30 may be reviewed to determine a party that is responsible for the damage event.

Figure 5:
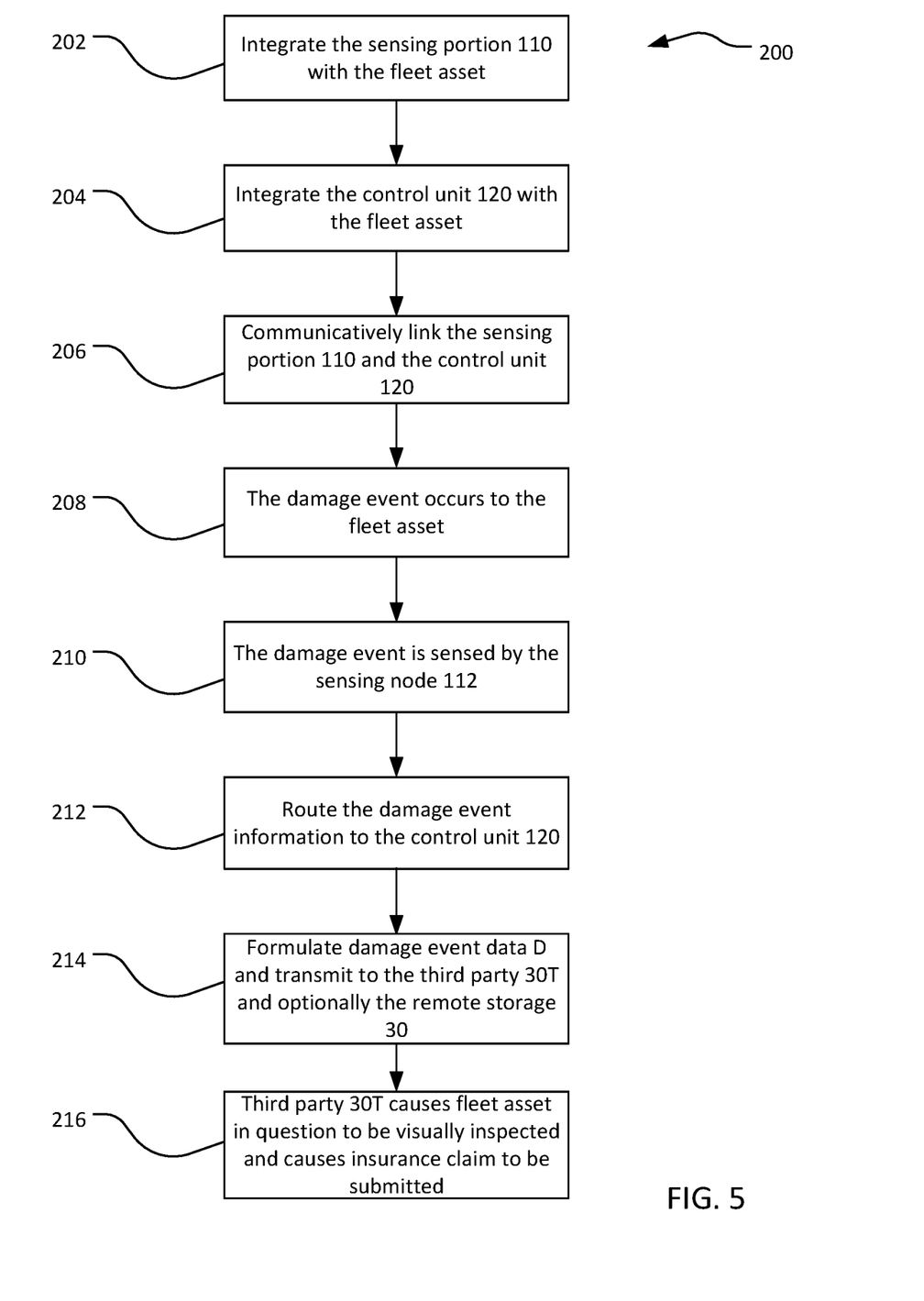
FIG. 5 is a flowchart depicting a method of using the damage detection system of FIG. 1, in an embodiment.

FIG. 5 depicts a method 200 of retrofitting a fleet asset with the damage detection system 100. First, at step 202, the sensing portion 110 may be disposed on the outer surface of and/or within the fleet asset. For example, a plurality of electronic ribbon cables may be strategically located on the outer surface of the fleet asset and a seismic sensor may be disposed within the control unit 120 or elsewhere to respectively detect impacts to the outer surface and the fleet asset being dropped (e.g., by a yard hostler truck). Installing the sensing portions 110 may involve placing one or more housings 116, containing one or more sensing nodes 112 and/or communication nodes 114, on an external surface of the container 10. The components of the sensing portions 110 may then be secured with fasteners 118. Then, at step 204, the control unit 120 may be similarly integrated with the fleet asset. At step, 206, the sensing portion(s) 110 and the control unit 120 may be communicatively linked. For example, as described above, the communication node 114 and the communication device 122 may be linked (e.g., wired and/or wirelessly) for the transference of information therebetween. In some embodiments, wires (or other current carrying cables) of the sensing node 112 may be linked to the control unit 120 for the monitoring of the current through the wires directly. Then, at step 208, a damage event may occur. For instance, an object may collide with the fleet asset the damage detection system 100 is monitoring, a yard hostler truck may drop the fleet asset while transporting same from one dock to another, et cetera.

At step 210, the sensing node 112 may sense the damage event, and at step 212, the communication node(s) 114 may route the detected information to the control unit 120. Alternately, in embodiments where a separate communication node is omitted, the sensing node 112 may communicate the sensed information directly to the control unit 120. At step 214, the control unit 120 may formulate the damage event data D. For example, the control unit may determine the location of the damage and include same in the damage event data D, include a time stamp indicating a time of occurrence the damage event, include the geolocation of the fleet asset at the time of the damage event, include operator information, environmental information, et cetera. The damage event data D may be transmitted by the control unit 120 (e.g., over the satellite telematics system and/or other network) to the third party 30T. In embodiments, the damage event data D may also be stored in a remote storage 30. While not expressly shown in FIG. 5, in embodiments, the control unit 120 may also generate a local alert to indicate the determination of a damage event. At step 216, the third party 30T may cause the fleet asset in question (e.g., a portion thereof identified by the system 100 as being damaged) to be visually inspected, and where required, submit a claim to the insurer. The artisan will understand that step 216 need not take place immediately upon the determination of the damage event, but may take place sometime (e.g., a few hours, a few days) thereafter. Further, in embodiments, the third party 216 may only cause the visual inspection to take place where the control unit 120 indicates the damage is not insubstantial.

It shall be understood that the method 200 may have steps omitted, added, and/or modified, and that the order of carrying out these steps may be altered. For example, in embodiments, the step of installing the sensing portion 110 (step 202) may be performed after the step of installing the control unit 120 (step 204). As another example, the step of authenticating a user before operating the fleet asset may be added to the method 200.

Thus, as has been described, the systems and methods disclosed herein may allow for structural damage to fleet assets to be inexpensively and conveniently monitored in real-time. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

The disclosure claimed is:

1. A method of retrofitting a fleet asset to enable real-time damage monitoring thereof, said fleet asset having a first wall and a second wall opposing said first wall, said method comprising:
adhesively securing a first ribbon wire to and along an outer surface of said first wall;
adhesively securing a second ribbon wire to and along an outer surface of said second wall;
continuously transmitting, using a control unit, current through said first ribbon wire and said second ribbon wire;
identifying, using said control unit, a damage event in response to a break in said transmitted current in said first ribbon wire or said second ribbon wire
formulating damage event data associated with said damage event in response to said identification of said damage event, said damage event data including a time of said damage event, a location of a damaged area on said fleet asset, and a geolocation of said fleet asset; and
transmitting said damage event data to a remote location.

2. The method of claim 1, further comprising securing said control unit to an exterior of said fleet asset.

3. The method of claim 1, wherein said first ribbon wire comprises a plurality of individual ribbon wires, each of said plurality of ribbon wires being independently coupled to said control unit.

4. The method of claim 1, further comprising:
providing a seismic sensor; and
configuring said control unit to identify a damage incident in response to an output of said seismic sensor.

5. The method of claim 4, wherein said geolocation is obtained through a GPS telematic system of said fleet asset.

6. The method of claim 1, further comprising communicatively coupling a force sensor to said control unit.

7. The method of claim 6, wherein tape is used to adhesively secure said first ribbon wire to and along said outer surface of said first wall.

8. The method of claim 1, wherein said damage event data is transmitted to said remote location in real-time.

9. The method of claim 1, wherein said damage event data is transmitted to said remote location at a predetermined time.

10. The method of claim 1, further comprising generating a localized alert in response to said identification of said damage event.

11. The method of claim 1, wherein said first ribbon wire is adhesively secured to and along said outer surface of said first wall along a length of said first wall.

12. A method of retrofitting a fleet asset to enable real-time damage monitoring thereof, comprising:
adhesively securing a first wire sensor to and along a first outer surface of said fleet asset and adhesively securing a second wire sensor to and along a second outer surface of said fleet asset;
continuously transmitting, using a control unit, current through each of said first and second wire sensors;
identifying, using said control unit, a damage event in response to a break in said transmitted current in at least one of said first wire sensor and said second wire sensor;
formulating damage event data associated with said damage event in response to said identification of said damage event, said damage event data including a location of a damaged area of said fleet asset; and
transmitting said damage event data to a remote location.

13. The method of claim 12, wherein said damage event data is visible on a display of said control unit.

14. The method of claim 12, further comprising providing a seismic sensor within said control unit.

15. A method of retrofitting a fleet asset to enable damage monitoring thereof, comprising:
securing a wire to and along each of a plurality of outer surfaces of said fleet asset;
continuously transmitting, using a control unit, current through said each of said wires;
identifying a damage event in response to a break in said transmitted current;
formulating damage event data associated with said damage event in response to said identification of said damage event, said damage event data including damage location information and fleet asset location information; and
transmitting said damage event data to a remote location.

16. The method of claim 15, further comprising coupling said control unit to a GPS satellite telematic system associated with said fleet asset.

17. The method of claim 15, wherein said damage event data is visible on a display of said control unit.

18. The method of claim 15, further comprising providing a seismic sensor within said control unit.

19. The method of claim 15, wherein said wire is electronic ribbon cable.

20. The method of claim 19, wherein no wire is secured to a lift point of said fleet asset.

* * * * *